J. M. J. NESS.
GEARING.
APPLICATION FILED FEB. 14, 1913.
1,096,793.
Patented May 12, 1914.
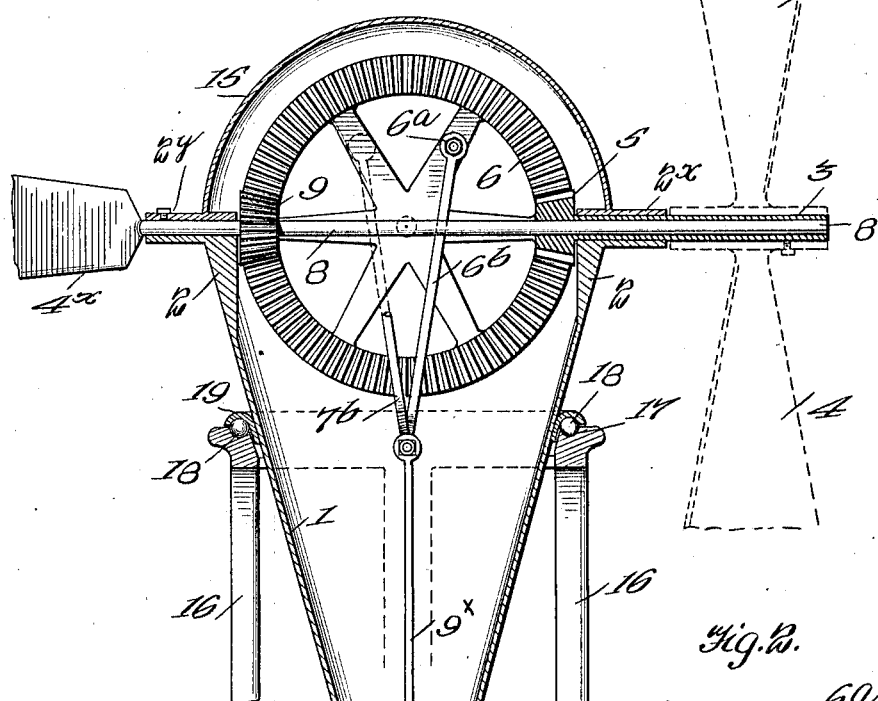
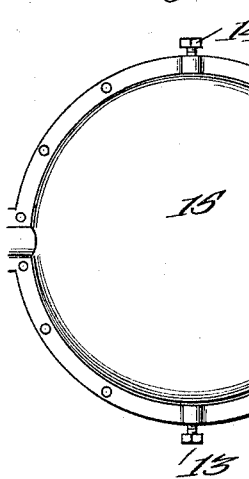
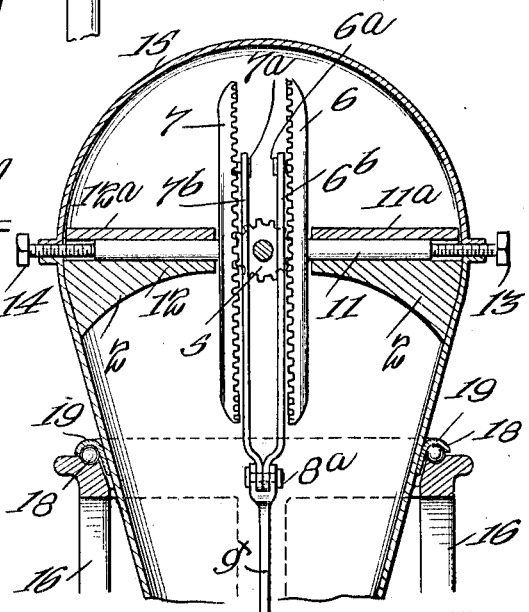
WITNESSES
E. W. Callaghan
L. A. Stanley
INVENTOR
JENS M. J. NESS,
BY Munn & Co.
ATTORNEYS

UNITED STATES PATENT OFFICE.

JENS M. J. NESS, OF MADDOCK, NORTH DAKOTA, ASSIGNOR OF ONE-FOURTEENTH TO GUSTAV O. HAUGEN, ONE-FOURTEENTH TO HENRY G. DOKKEN, ONE-FOURTEENTH TO JAMES CLEVELAND, ONE-FOURTEENTH TO CHRISTOPHER A. SAVOLD, ONE-FOURTEENTH TO EDWARD C. OLSEN, AND ONE-FOURTEENTH TO PETER OLSRUD, ALL OF MADDOCK, NORTH DAKOTA.

GEARING.

1,096,793.      Specification of Letters Patent.      Patented May 12, 1914.

Application filed February 14, 1913. Serial No. 748,360.

*To all whom it may concern:*

Be it known that I, JENS M. J. NESS, a citizen of the United States, and a resident of Maddock, in the county of Benson and State of North Dakota, have made certain new and useful Improvements in Gearing, of which the following is a specification.

My invention relates to improvements in transmission or gearing devices for wind mills, and it consists in the combinations, constructions, and arrangements herein described and claimed.

An object of my invention is to provide a device of a simple nature for converting rotary motion into reciprocating motion for working the pump rod.

A further object of my invention is to provide a device which may be inclosed in an oil reservoir, thereby insuring perfect lubrication of the parts.

A further object of my invention is to provide novel means for mounting the transmission mechanism.

A further object of my invention is to provide novel means for permitting a rotary movement of the vane and the transmission mechanism as a whole.

Other objects and advantages will appear in the following specification and the novel features of the device will be particularly pointed out in the appended claims.

My invention is illustrated in the accompanying drawings forming part of this application in which—

Figure 1 is a section through the device, Fig. 2 is an enlarged section taken at right angles to Fig. 1, and Fig. 3 is a plan view of the device.

In carrying out my invention I provide a conical reservoir 1 which is provided with castings 2 at its upper end. These castings may be integral with the reservoir or secured to the walls of the latter. One of these castings is extended as shown at $2^x$ to form a bearing for a sleeve 3 upon which is mounted the rotor 4 of the wind mill. One end of the sleeve is provided with a gear 5 arranged to mesh with a pair of large gears 6 and 7 respectively. A shaft 8 extends through the sleeve 3, the gear 5, and through a housing $2^y$ on the opposite side of the reservoir. The shaft terminates in a vane or tail piece $4^x$. This shaft 8 is rigidly secured in the housing $2^y$ so that it is prevented from rotating about its own axis. The shaft 8 bears a loosely mounted gear 9 which is similar in size to the gear 5, and is arranged to mesh with the two gears 6 and 7. The gear 6 is provided with a pin $6^a$ to which is pivotally connected a link or connecting rod $6^b$. The gear 7 is similarly provided with a connecting rod $7^b$. The rods $6^b$ and $7^b$ are pivotally connected together by means of a pin $8^a$ to the pitman rod $9^x$. The latter passes downwardly through the stuffing box 10 at the lower end of the reservoir. The gear 6 is secured to a stub shaft 11 which is mounted in bearings $11^a$. A stub shaft 12 is provided for the gear 7 and it is mounted in bearings $12^a$. An adjusting screw 13 is provided at one end of the shaft 11 and a similar adjusting screw 14 is provided for adjusting the position of the shaft 12. A cap or cover 15 is arranged to surmount the reservoir so as to keep out the dust and dirt.

The supports for the reservoir are shown at 16. These supports are provided with a ball race 17 having balls 18. The reservoir 1 is provided with an annular curved bearing member 19 arranged to rest upon the balls 18, as shown in Figs. 1 and 2. The lower portion of the conical reservoir is disposed in a guide member 20.

From the foregoing description of the various parts of the device the operation thereof may be readily understood. The rotation of the rotor 4 of the wind mill causes the rotation of the sleeve 3 and the turning of the gear 5. This drives the gears 6 and 7 in opposite directions, the gear 9 forming a spacing member for keeping the two gears 6 and 7 in position. The rotation of the gears in opposite directions causes the movement of the connecting rods $6^b$ and $7^b$. These are pivoted at the same distance from the centers of the gears so that when in the position shown in Fig. 2 the pitman rod is at the highest point of its stroke. It is obvious that as the gears turn the rod will be forced downwardly and after the gears have turned 180° it will be forced upwardly, thus there is a continued reciprocation of the rod as the wind mill turns. The reservoir 1 may be filled with oil so that the parts will run noiselessly owing to the perfect lubrication. The cap 15 prevents the admission of any dirt or dust and insures the perfect working of the device. The oil is prevented from leaking out of the reservoir by means of the stuffing box 10. By means of the set screws 13 and 14 any wear on the gears 6 and 7 may be taken up.

The provision of the ball bearing supports for the reservoir permits the device as a whole to revolve so as to keep the rotor 4 headed toward the wind. The revolution of the reservoir and of the transmission mechanism is of course about an axis coincident with the axis of the rod $9^x$.

I claim:—

1. In a transmission mechanism for wind mills, an oil reservoir, a driving sleeve rotatably mounted at the top of the reservoir, a gear at the end of the sleeve, a pair of beveled gears arranged to mesh with the first named gear, a connecting rod pivotally secured to each of said beveled gears, and a pitman rod pivotally secured to the connecting rods.

2. In a transmission mechanism for wind mills, an oil reservoir, a driving sleeve rotatably mounted at the top of the reservoir, a gear at the end of the sleeve, a pair of beveled gears arranged to mesh with the first named gear, a connecting rod pivotally secured to each of said beveled gears, a pitman rod pivotally secured to the connecting rods, and a stuffing box at the bottom of said reservoir for guiding the pitman rod.

3. In a transmission mechanism for wind mills, an oil reservoir, a driving sleeve rotatably mounted at the top of the reservoir, a gear at the end of the sleeve, a pair of beveled gears arranged to mesh with the first named gear, a connecting rod pivotally secured to each of said beveled gears, a pitman rod pivotally secured to the connecting rods, a stuffing box at the bottom of said reservoir for guiding the pitman rod, and means for taking up the wear on said beveled gears.

4. In a transmission mechanism for wind mills, an oil reservoir, a driving sleeve rotatably mounted at the top of the reservoir, a gear at the end of the sleeve, a pair of beveled gears arranged to mesh with the first named gear, a connecting rod pivotally secured to each of said beveled gears, a pitman rod pivotally secured to the connecting rods, a stuffing box at the bottom of said reservoir for guiding the pitman rod, means for taking up the wear on said beveled gears, said last named means comprising a stub shaft for rotatably supporting each gear, and set screws disposed in the upper wall of the reservoir and arranged to engage the ends of said stub shafts.

5. In a transmission mechanism for wind mills, a conical oil reservoir having an opening in its bottom, a stuffing box carried by the lower end of the reservoir, castings secured to the upper end of the reservoir and forming part of the bearings, a sleeve disposed upon one of said bearings, a gear connected at the inner end of said sleeve, a rod extending through said sleeve and said gear and being secured in the wall on the opposite side of the reservoir, a loose gear on said rod, a pair of beveled gears arranged to mesh with both of said first named gears, a connecting rod pivotally secured to each of said bevel gears, a pitman rod arranged to pass through the stuffing box and being pivotally connected at its upper end with each of said connecting rods, a cap for said reservoir, and means for adjusting the positions of said beveled gears.

JENS M. J. NESS.

Witnesses:
  G. O. HAUGEN,
  L. S. GUNDERSON.